United States Patent
Joshi et al.

(10) Patent No.: US 11,714,699 B2
(45) Date of Patent: Aug. 1, 2023

(54) IN-APP FAILURE INTELLIGENT DATA COLLECTION AND ANALYSIS

(71) Applicant: Microsoft Technology Licensing, LLC, Redmond, WA (US)

(72) Inventors: Dhruv Joshi, Bellevue, WA (US); Brian Allan Mueller, Redmond, WA (US); Sameera Satyavan Desai, Redmond, WA (US); Suneetha Dhulipalla, Sammamish, WA (US); Dolly Sobhani, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 79 days.

(21) Appl. No.: 17/354,401

(22) Filed: Jun. 22, 2021

(65) Prior Publication Data

US 2022/0405159 A1 Dec. 22, 2022

(51) Int. Cl.
G06F 11/07 (2006.01)
G06F 11/36 (2006.01)

(52) U.S. Cl.
CPC ........ G06F 11/079 (2013.01); G06F 11/0706 (2013.01); G06F 11/0751 (2013.01);
(Continued)

(58) Field of Classification Search
CPC ............. G06F 11/0706; G06F 11/0751; G06F 11/0766; G06F 11/0775; G06F 11/0787;
(Continued)

(56) References Cited

U.S. PATENT DOCUMENTS 6,629,267 B1 * 9/2003 Glerum ............... G06F 11/0787
714/38.11
7,343,529 B1 3/2008 Klinkner et al.
(Continued)

OTHER PUBLICATIONS

Glerum, et al., "Debugging in the (Very) Large: Ten Years of Implementation and Experience", In Proceedings of the ACM SIGOPS 22nd Symposium on Operating Systems Principles, Oct. 11, 2009, pp. 103-116.
(Continued)

*Primary Examiner* — Bryce P Bonzo
*Assistant Examiner* — Albert Li

(57) ABSTRACT

Intelligent collection and analysis of in-app failure data is disclosed herein. Upon an application failure in a client device, the client device may collect failure information uniquely identifying a specific failure and provide the failure information to an analysis system. The analysis system may identify a specific failure that identifies the application and a specific portion of the code in the application, based on the failure information and match an action correlated to the specific failure where the action is uniquely designed to resolve the specific failure in the application. The action may include instructions for the client device used to intelligently lead to a resolution of the specific failure. The analysis system may transmit the action to the client device to perform the action and provide any follow up information to the analysis server. The analysis server may use the information to further analyze the specific failure.

20 Claims, 7 Drawing Sheets

(52) U.S. Cl.
CPC ...... *G06F 11/0778* (2013.01); *G06F 11/0787* (2013.01); *G06F 11/0793* (2013.01); *G06F 11/366* (2013.01); *G06F 11/0748* (2013.01); *G06F 11/0775* (2013.01)

(58) Field of Classification Search
CPC .. G06F 11/079; G06F 11/0793; G06F 11/302; G06F 11/366; G06F 11/0748
See application file for complete search history.

(56) References Cited

U.S. PATENT DOCUMENTS

| | | | |
|---|---|---|---|
| 2005/0120273 A1* | 6/2005 | Hudson | G06F 11/0748 714/E11.026 |
| 2006/0026466 A1* | 2/2006 | Pozarycki | G06F 11/0748 714/38.11 |
| 2008/0320336 A1 | 12/2008 | Qadir et al. | |
| 2010/0146325 A1* | 6/2010 | John | G06F 11/0748 714/E11.023 |
| 2015/0193296 A1* | 7/2015 | Chen | G06F 11/079 714/15 |
| 2017/0083399 A1* | 3/2017 | Smirnov | G06F 11/0778 |
| 2020/0133755 A1* | 4/2020 | Bansal | H04L 41/18 |
| 2020/0241953 A1* | 7/2020 | Ali | G06F 11/0787 |
| 2022/0019496 A1* | 1/2022 | Lozano | G06F 11/0778 |

OTHER PUBLICATIONS

"International Search Report and Written Opinion Issued in PCT Application No. PCT/US22/029098", dated Aug. 3, 2022, 14 Pages.

\* cited by examiner

| Failure | Application | Action | Failure Status |
|---|---|---|---|
| F1 | Outlook | Request freeform information from user | Recurrent |
| F2 | PowerPoint | Display notification to user to update antivirus software | Solved |
| | | Request information from user | |
| | | Q1: Was antivirus software executing at the time of the crash? | |
| | | Q1a. Which antivirus software? | |
| | | Q1b. Which version of the antivirus software? | |
| | | Q2: Do you have any application add-ins installed? | |
| F3 | Word | Q2a. Please provide the name and version of each add-in. | Final analysis in progress |
| F4 | OneNote | Request freeform information from user | New |
| F5 | Excel | Request consent to obtain co-executing application information | Initial analysis in progress |
| ... | ... | ... | ... |

IN-APP FAILURE INTELLIGENT DATA COLLECTION AND ANALYSIS

BACKGROUND

When applications fail or crash, the user is often left frustrated. In an effort to resolve application failure issues, application developers have developed solutions that include surveying all users to obtain information about the crash, such as steps the user took which may have led to the crash or other relevant information about what the user was using the application for before it crashed. However, many users may be frustrated and choose not to fill out the survey or otherwise provide information. Further, the request from every user that experiences the crash may result in an overwhelming number of responses for common crashes, leaving the developers with little information because the important bits get lost in the sheer volume of information. Accordingly, an intelligent system for collecting and analyzing in-app failure data is needed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for intelligent data collection and analysis for in-app failures. The computer-implemented method includes receiving a crash indication from a client device. The crash indication may include information about an application failure on the client device, where the application failure is a failure of one application of many that may provide crash indications on the client device. A specific failure may be identified based on the crash indication. The specific failure may identify the application and a particular portion of code of the application. An action correlated to the specific failure may be matched or identified. The action may include instructions uniquely designed for the specific failure to lead to a resolution of the specific failure in the application on the client device. The action may be transmitted to the client device. Other embodiments of this aspect include corresponding computer systems, apparatus, and computer programs recorded on one or more computer storage devices, each configured to perform the actions of the methods.

Implementations may include one or more of the following features. In some embodiments, the crash indication may include a failure hash. In some embodiments, the crash indication may include a stack hash. In some embodiments, the action may include instructions to collect specific information related to the application failure from a user of the client device. In some embodiments, the action may include instructions to request consent from a user of the client device to collect specific information related to the application failure from the client device. In some embodiments, the action may include instructions to display a notification on the client device. In some embodiments, the computer-implemented method may include modifying a repository where the repository may include correlation information between the specific failure and the action. The modifying may include changing the action correlated with the specific failure based on information received from a number of crash indications. In some embodiments, the computer-implemented method may include generating trend information about the specific failure based on a number of crash indications received from a number of client devices. In some embodiments, the computer-implemented method may include modifying a repository that may include correlation information between the specific failure and the action. The modifying may include changing the action correlated with the specific failure based on the trend information. In some embodiments, changing the action may include changing the instructions to request information related to the application failure from a user of the client device. Implementations of the described techniques may include hardware, a method or process, or computer software on a computer-accessible medium.

BRIEF DESCRIPTION OF THE DRAWINGS

Many aspects of the disclosure can be better understood with reference to the following drawings. The components in the drawings are not necessarily drawn to scale. Some components or operations may not be separated into different blocks or may be combined into a single block for the purposes of discussion of some embodiments. Moreover, in the drawings, like reference numerals designate corresponding parts throughout the several views. While several embodiments are described in connection with these drawings, the disclosure is not limited to the embodiments disclosed herein. The technology is amenable to various modifications and alternative forms. The disclosure and figures herein are intended to provide a description of certain embodiments, and the intent is to cover all alternatives, modifications, and equivalents.

FIG. 5 illustrates exemplary failure/action correlation data, according to some embodiments.

DETAILED DESCRIPTION

This disclosure is generally related to telemetry and an in-application feature and corresponding cloud service for intelligently collecting and analyzing information about an in-app failure on a client device. Telemetry data about the application crash may initially be collected and follow up information about the application crash may be intelligently collected to quickly and efficiently identify a root cause for the specific failure that caused the application crash. Existing systems tend to blindly request as much information as possible and the same information from all users when an in-app crash occurs. This type of request may leave the user frustrated and unwilling to provide a response to the request. In some cases, especially for a common fault that causes a crash, the number of responses may be overwhelming, which may make the responses relatively useless to the developer or engineer who is investigating the issue. The sheer number of responses may make sorting through them more wasteful than helpful. With such systems, the developers are left with little additional information that is relevant to address the reason for the crash, and the users are left frustrated. Rather than blindly requesting the same information from every user and device that experiences an in-app failure, the present system identifies specific failure information and a corresponding action to take based on the specific failure. The system transmits the action to the client device. In some cases, the action may include intelligently collecting relevant information about the in-application (in-app) failure. The relevant information collected may be stored and analyzed to further adjust the actions correlated with the specific failure for future users.

Figure 1:
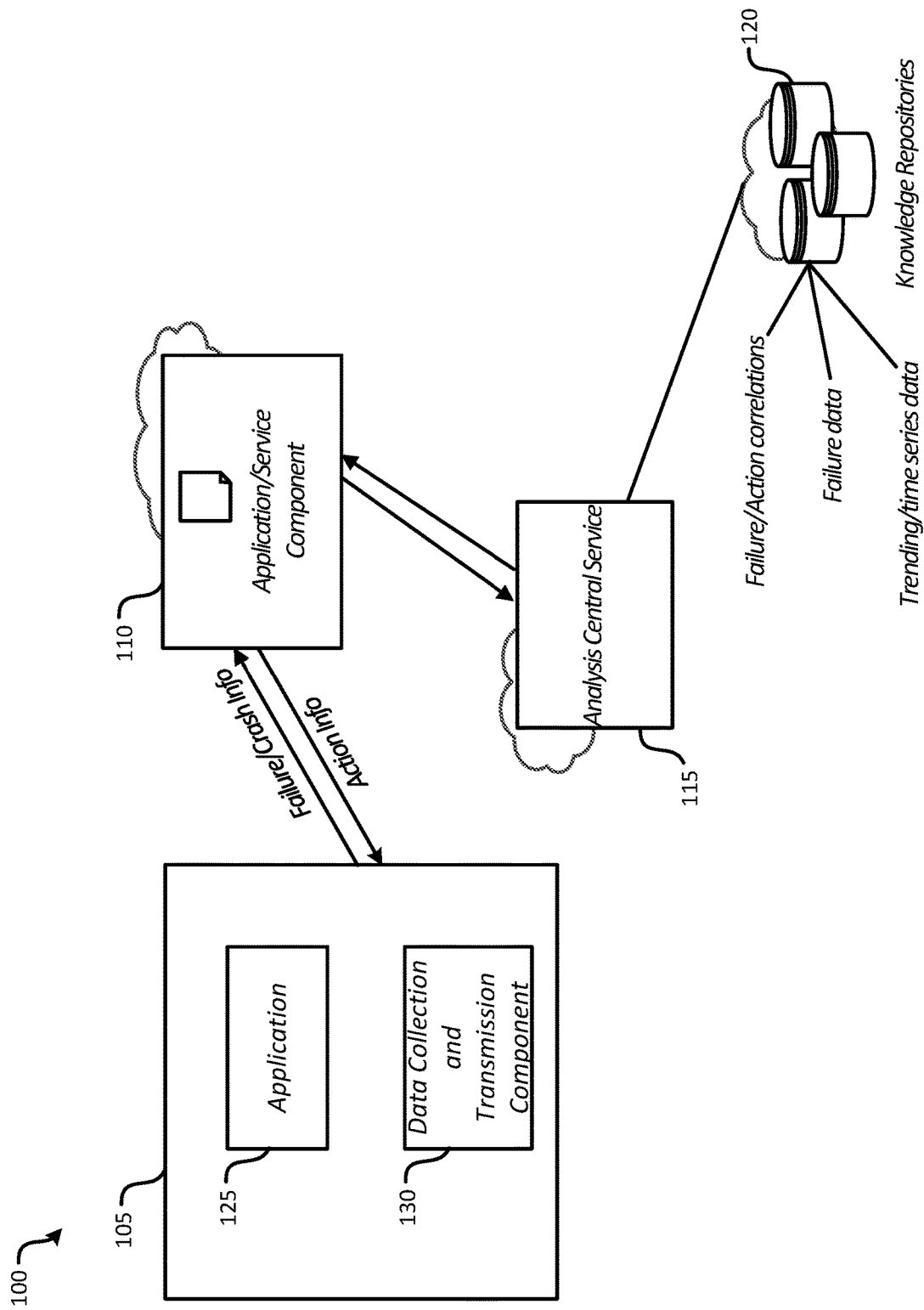
FIG. 1 illustrates an exemplary system for collecting and analyzing in-app failure data, according to some embodiments.

FIG. 1 illustrates an exemplary system 100 for intelligently collecting and analyzing in-app failure data. System 100 may include a user device 105, application service component 110, analysis central service 115, and knowledge repositories 120. System 100 may include more or fewer components than discussed here, and/or the functionality described with respect to system 100 may reside within more or fewer computing systems without departing from the scope of this description.

Figure 7:
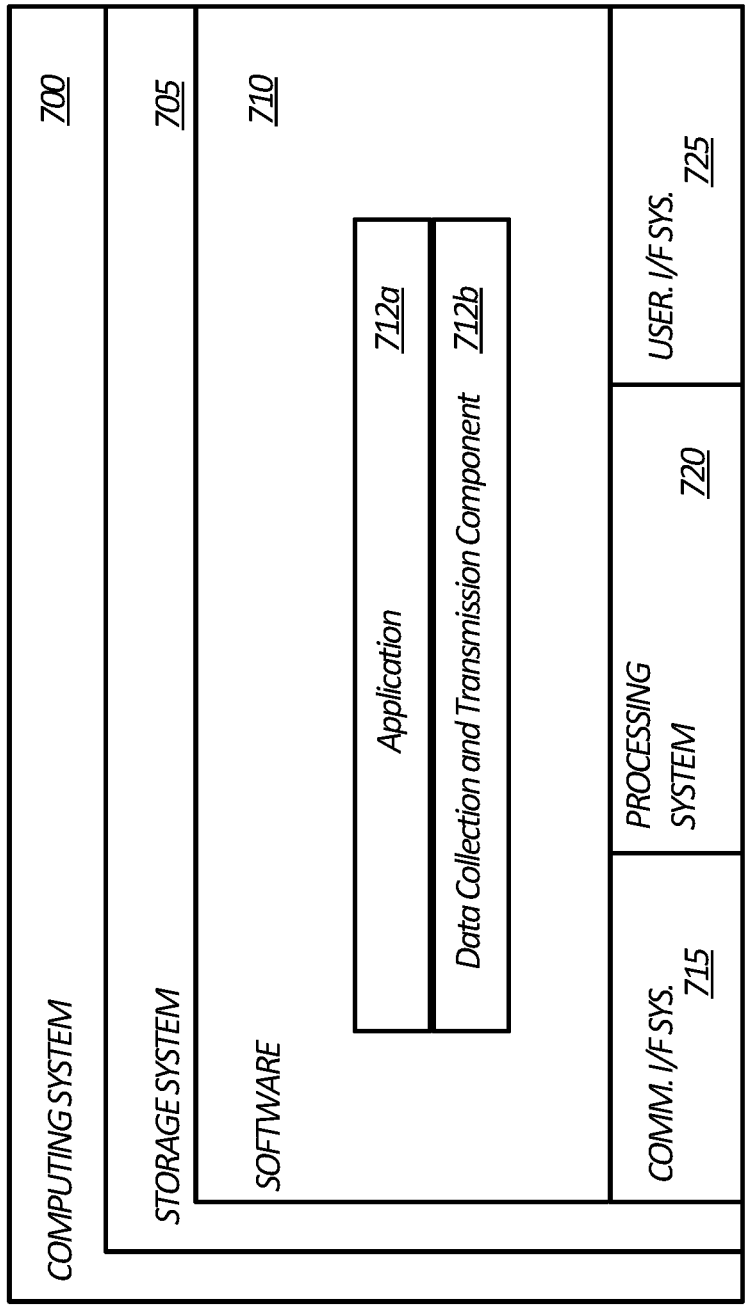
FIG. 7 illustrates a computing system.

User device 105 may be any suitable computing system, such as computing system 700 as described with respect to FIG. 7. For example, user device 105 may be a laptop, desktop, smartphone, tablet, or the like. While only a single user device 105 is depicted in FIG. 1, any number of user devices 105 may be included in system 100. User device 105 may include application 125 and data collection and transmission component 130. Each of these components may include instructions stored in memory that are executed by a processor of the user device 105. While only two components are depicted, the functionality described may be included in more or fewer components than is described without departing from the scope of this description. For example, the data collection and transmission component 130 may be a part of the application 125. Further, user device 105 may have many other components and features not described here for the sake of brevity. For example, the user device 105 may include many applications 125 as well as other hardware and software components, such as memory, transceivers, and the like.

Application 125 may be any application including, for example, a word processing application (e.g., MICROSOFT WORD®), a presentation creation application (e.g., MICROSOFT POWERPOINT®), or any other application (e.g., MICROSOFT EXCEL®, MICROSOFT ONENOTE®, MICROSOFT OUTLOOK®, MICROSOFT PUBLISHER®, MICROSOFT PROJECT®, or the like). The user may execute the application on the user device 105. The application 125 may be one of many applications loaded on the user device 105. In some embodiments, multiple applications may be loaded and executing simultaneously on the user device. The application 125 may experience an error including a crash, hang, manual termination of the application (e.g., with a task manager), or other failure mode that causes the application to exit in an undesirable manner. When such an error event of an application 125 occurs, telemetry data may be generated (e.g., by the operating system or a remote system) about the error event such as a failure hash, a stack hash, or any other crash indication information. For example, the failure hash may include specific information about the identity of the failure that caused the crash. For example, the failure hash may include a unique failure identifier that indicates the specific failure experienced by the application 125 and specifically identifies the application 125 from the many applications that may be executing on the user device 105 as well as a specific portion of the code of the application 125 that experienced the failure. This unique failure identifier may be a unique combination (e.g., combination or concatenation) of the exception information including, for example, the blamed exception class, exception code, and/or module where the failure occurred and/or symbol where the failure originated or some combination of such information. The failure hash may be a hash (using a secure hashing function, for example) of the unique failure identifier. The stack hash may be a hash (using a secure hashing function, for example) of the callstack of the crashing thread at the time of the failure, which may provide the unique failure identifier of the specific failure. The unique failure identifier that indicates the specific failure may be generated, captured, and/or stored in a way other than the failure hash or stack hash. The crash information may include the unique failure identifier along with other information about the application crash.

The data collection and transmission component 130 may collect the crash information including the failure hash, the stack hash, and/or any other information that indicates the specific failure. The data collection and transmission component 130 may use the collected information to generate a crash indicator that includes, for example, the failure hash or stack hash, and transmit the crash indication to the application service component 110. The data collection and transmission component 130 may be a standalone component (e.g., a watchdog) that monitors a single application 125 or multiple applications 125 executing on the computing device 105. In some embodiments, the data collection and transmission component 130 may be incorporated into the application 125.

The application service component 110 may be cloud based. The application service component 110 may reside on a cloud-based server computing device, for example. The computing device may be any type of computing device such as, for example, computing device 700 as described with respect to FIG. 7. The application service component 110 may be a component that serves as an interface to the analysis central service 115. The application service component 110 may transmit the crash indication to the analysis central service 115.

The analysis central service 115 may perform the targeting logic for identifying a correlated action to perform based on the specific failure that occurred. The analysis central service 115 may receive the crash indication and identify from the crash indication the specific failure, including identifying the application 125 out of the applications on the client device 105 that may provide crash indications as well as the specific portion of the code (e.g., module, function, and/or so forth) in application 125 that experienced the error. For example, if the crash indication includes the failure hash, the failure hash includes information that specifically identifies the failure experienced by the application 125. Similarly, if the crash indication includes a hash of the stack at the time the crash occurred (i.e., stack hash), the information in the stack hash may be used to specifically identify the failure. The analysis central service may store the failure data from the crash indication in the repository 120. For example, the date and time stamp and the specific failure may be saved. This information may be used by the analysis central service 115 to generate trending data (e.g., time series data) regarding the specific failure, which may be used as described later in this specification.

The analysis central service 115 may identify an action based on the specific failure by matching a correlated action with the specific failure. For example, the repository 120 may include a table or other data structure that contains information correlating the specific failure with an action. An example table with exemplary data are shown in FIG. 5. The action may include instructions for the user device 105 to perform, for example, to intelligently collect information about the application crash. The action may be uniquely designed for the specific failure to lead to a resolution of the specific failure in the application 125. The information may be used to solve the issue that caused the crash, for example. Accordingly, using the correlation information, the analysis central service may identify the action and send the action to the application service component 110. The application service component 110 may transmit the action to the data collection and transmission component 130. The data collection and transmission component may perform the instructions contained in the action. Example actions may include providing a notification to the user (e.g., if the issue is solved the notification may provide the solution), asking survey questions intelligently to collect further, useful data about the crash (e.g., if another executing application is suspected to be creating a conflict, the survey may include questions about whether the user was simultaneously executing the other application), asking general questions or requesting freeform input from the user (e.g., if little is known about the issue because, for example, it is a new issue, general questions may be asked of a certain number of initial users that experience the crash to narrow down the possible reasons for the crash), requesting consent from the user to obtain specific information from the user device 105 (e.g., for privacy reasons, if consent is not obtained prior, the consent may be used to automatically collect the information needed regarding the application crash), and the like. Once any additional information is obtained from executing the instructions in the action, the data collection and transmission component 130 may send the additional information to the application service component 110. The application service component may transmit the additional information to the analysis central service 115. The analysis central service 115 may store the additional information in the repository 120 for future use to analyze the specific failure. In some embodiments, the analysis central service 115 may notify a developer of the occurrence of the specific failure.

Figure 2:
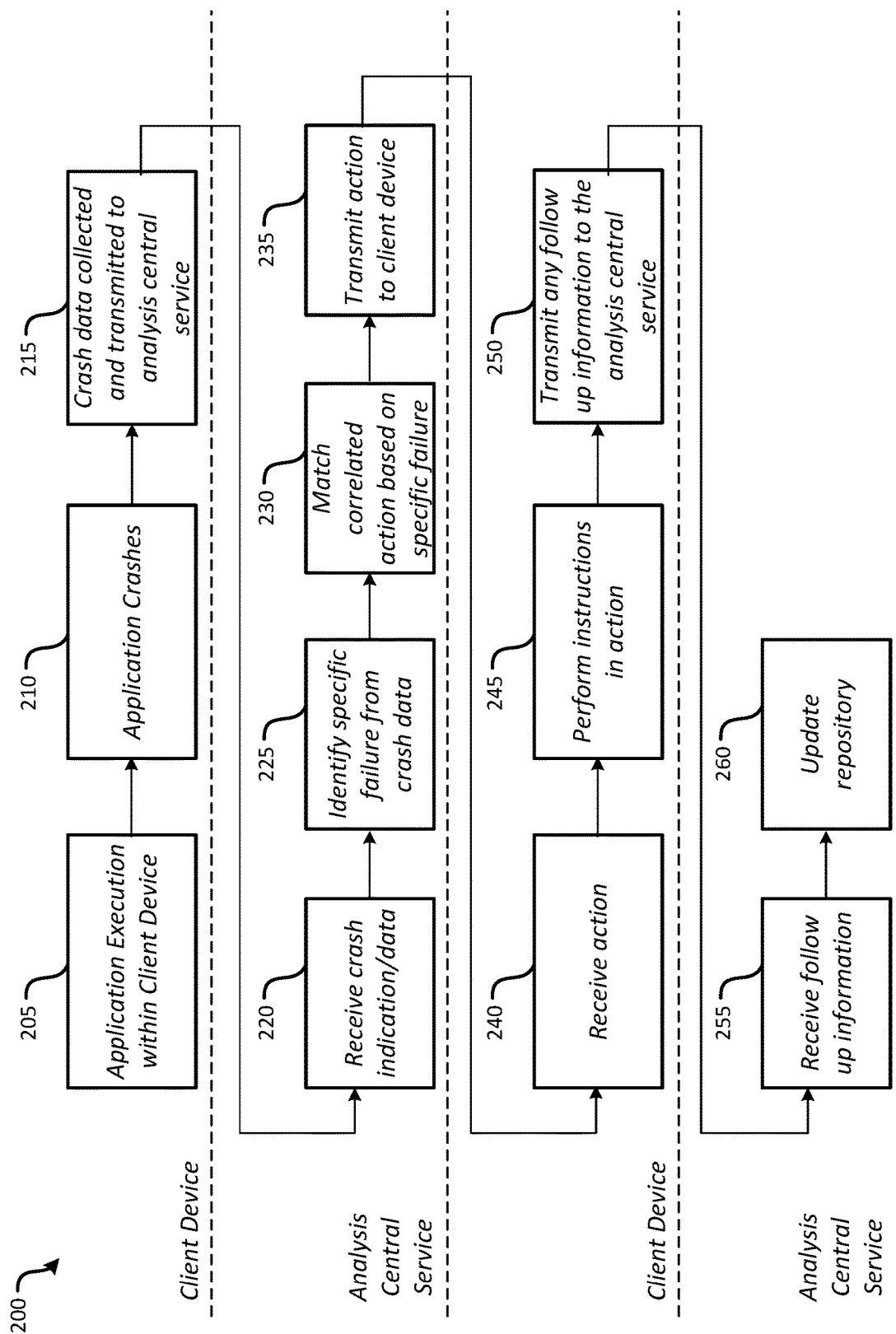
FIG. 2 illustrates an exemplary flow of data and events, according to some embodiments.

FIG. 2 illustrates an exemplary flow 200 of events and data through system 100. At 205, the application is executed on the client device (e.g., user device 105). At 210, the application crashes on the client device. At 215, the crash data is collected and transmitted to the analysis central service (e.g., analysis central service 115). The crash data may include a failure hash, a stack hash, or any other information about the crash that may assist the analysis central service in identifying the specific failure that occurred.

The analysis central service receives the crash indication/data at 220. Using the crash data, the analysis central service identifies the specific failure at 225. The specific failure includes the application and a particular portion of the code of the application that experienced the code. For example, the particular portion of the code that was executing when the application failure occurred may be identified. For example, the failure hash or stack hash may include an identifier for the specific failure. The analysis central service matches the correlated action based on the specific failure at 230. For example, the analysis central service may query a repository (e.g., repository 120) for actions correlated with the specific failure that was identified based on the crash data. The actions are uniquely designed for each specific failure to lead to a resolution of the specific failure of the particular application. The actions may include specific instructions for the client device to execute to intelligently collect follow up data about the crash, provide information to the user to resolve the failure, and so forth. The analysis central service may transmit the action to the client device at 235.

The client device may receive the action at 240. The client device performs the instructions in the action at 245. For example, the instructions may include requesting additional information from the user, automatically collecting specific information from the client device, providing a notification including a possible solution to resolve the issue that caused the crash, automatically fixing or modifying a component on the client device (e.g., installing a patch for the application), requesting consent from the user to automatically collect specific information from the client device if such permission was not previously granted, and the like. At 250, the client device may transmit any follow up information collected based on executing the actions to the analysis central service.

At 255 the analysis central service may receive the follow up information obtained by the client device from executing the actions. The analysis central service may update the repository at 260 with the follow up information. The analysis central service may also perform some analysis to further modify the repository data. For example, the analysis central service may determine that a sufficient number of freeform responses were received about the specific failure to avoid having an overwhelming number of responses for analysis and to avoid further frustrating clients by continuing to ask the same questions about the crash. Frustrated customers are less likely to respond to surveys and requests for information, so limiting the number of clients asked about any given crash may improve the likelihood that the client does not become frustrated and will later answer any questions asked about other crashes where sufficient data has not yet been collected. If a sufficient number of responses have been received, the analysis central service may update the repository to modify the action correlated with the specific failure. The analysis central service may further send a notification to a developer that a sufficient number of responses have been received so that the developer may know the data is ready for further analysis. For example, once a statistically significant number of responses have been received, the system may determine no further responses are necessary to proceed with analyzing the information to resolve the specific failure. As another example, the follow up information may indicate that a previously solved issue may be recurring. The analysis central service may generate trend data and/or may obtain a status from the repository to determine that the specific failure had been previously resolved. However, the follow up information may indicate that a new issue is causing the specific failure again. In such instances, the analysis central service may update the action correlated with the specific failure to obtain general information, for example in the form of a freeform request, from the client so that the new cause of the specific failure can be narrowed down or identified. The analysis central service may perform other analysis and updates to the repository based on the specific circumstances of the information received.

Figure 3:
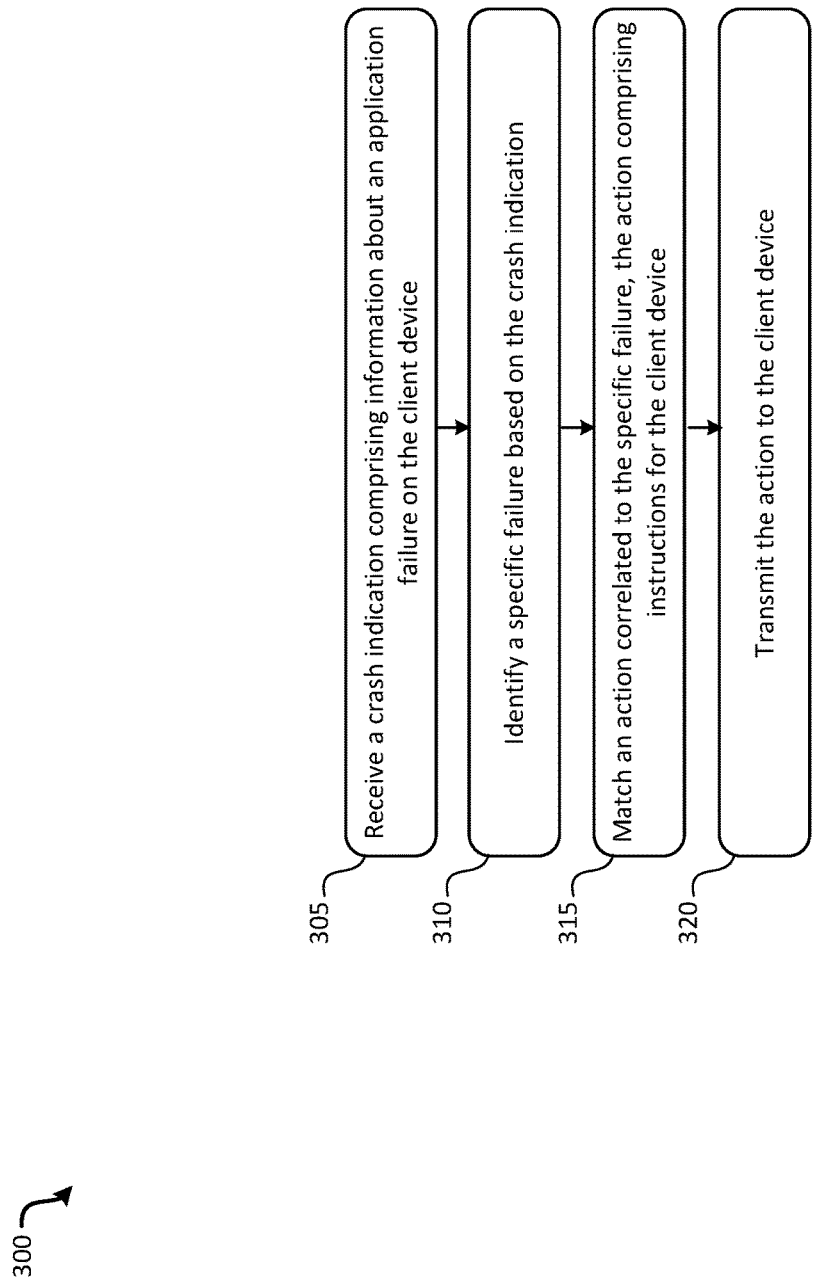
FIG. 3 illustrates an exemplary process of intelligently collecting data from a client device based on an in-app failure, according to some embodiments.

FIG. 3 illustrates an exemplary method 300 for intelligently collecting data regarding an in-app crash (e.g., a crash of application 125). The method 300 may be performed by system 100 as described with respect to FIG. 1. More specifically, the method 300 may be performed by analysis central service 115. The method 300 may begin with the analysis central service 115 receiving a crash indication comprising information about an application failure on the client device at 305. The application failure may include a failure of one application of several applications that provide crash indications on the client device. For example, the application 125 on user device 105 may crash, and the data collection and transmission component 130 may collect crash data for the analysis central service to use to identify the specific failure that occurred.

The analysis central service 115 may process the crash indication to identify the specific failure at 310. The specific failure may identify the application and a particular portion of the code of the application that experienced the error. For example, the analysis central service 115 may use the failure hash or the stack hash to identify the specific failure, which may be identified with a code in the hash, for example.

Using the specific failure, the analysis central service 115 may match an action correlated to the specific failure at 315. For example, the analysis central service 115 may query the repository 120 that contains specific failure/action correlations to identify the action correlated to the specific failure. The action may include instructions for the user device 105 to execute. The action may be uniquely designed for the specific failure to lead to a resolution of the specific failure in the particular application. For example, the instructions may be used to intelligently collect data from the user device 105.

At 320, the analysis central service 115 may transmit the action to the user device 105. The user device (i.e., client device) may perform the instructions to request additional information from the user, automatically collect additional information from the user device 105, notify the user of a solution or other information that may help the user, and so forth.

Figure 4:
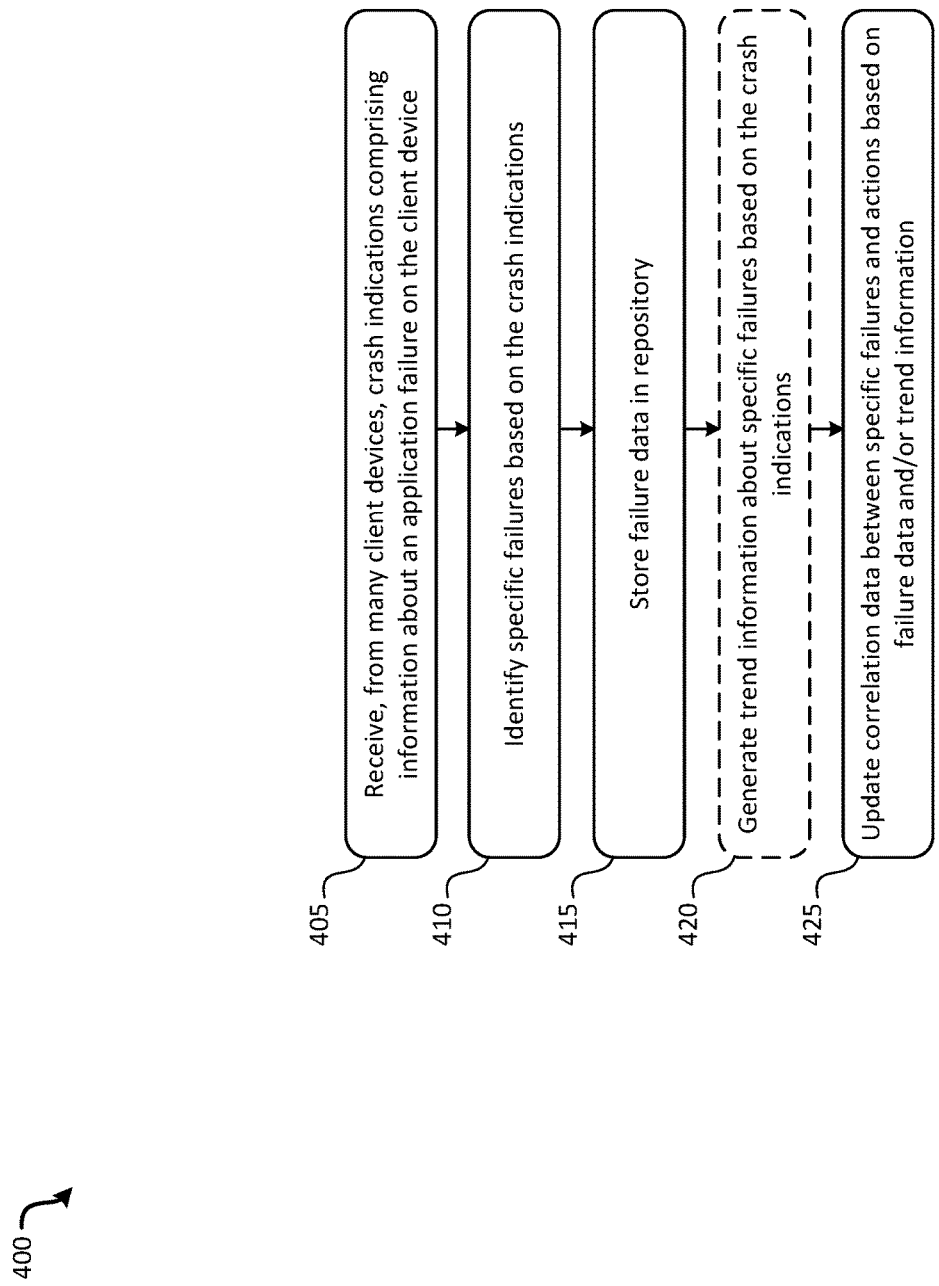
FIG. 4 illustrates an exemplary process for maintaining information for intelligently collecting and analyzing data related to in-app failures, according to some embodiments.

FIG. 4 illustrates an exemplary method 400 for intelligently collecting data regarding an in-app crash (e.g., a crash of application 125). The method 400 may be performed by system 100 as described with respect to FIG. 1. More specifically, the method 400 may be performed by analysis central service 115. The method 400 may begin at 405 with the analysis central service 115 receiving crash indications from many user devices 105 (i.e., client devices). The crash indications may each include information about an application failure on the respective user device 105. The user devices 105 may report crash indications about any number of applications 125.

At 410, the analysis central service 115 identifies specific failures for each of the crash indications based on the information included in each respective crash indication. Many of the crash indications may be related to the same specific failure, and other crash indications may be related to different specific failures. Each specific failure includes a particular application that experienced the error as well as a particular portion of the code of that particular application.

At 415, the analysis central service 115 may store the failure data from each of the crash indications in the repository 120. For example, information relevant to the specific failure for each crash indication may be stored in the repository 120. In some embodiments, the entire crash indication may be stored in the repository 120 for each crash indication. Which information is stored may be tailored to each system 100.

At optional step 420, the analysis central service 115 may generate trend information about specific failures based on the crash indications. For example, a time series graph may be generated that indicates whether the rate of occurrence of the specific failure is increasing, decreasing, low, high, and/or the like. This trend information may be used to determine whether a proposed solution to resolve the specific failure is working, whether the specific failure is a rare failure, whether the specific failure is recurring, whether the specific failure is common, and/or the like.

At 425, the analysis central service 115 may update the correlation data between specific failure and actions based on the failure data and/or the trend information. For example, in some embodiments the failure data may indicate that sufficient responses have been received for a specific failure to allow analysis. For example, a decision may be made that a statistically significant number of responses have been received to allow for further analysis to resolve the specific failure. The analysis central service 115 may update the action correlated to the specific action to no longer request information from the user and rather provide a notification or, as another example, modify the action to request more specific information about the specific failure rather than requesting general information. In some embodiments, the analysis central service 115 may also notify a developer or other administrator that the action has been changed.

FIG. 5 illustrates an exemplary table 500 including exemplary correlation data between specific failures and actions. The data included in the table 500 is exemplary only for the purposes of providing examples of potential actions, failures, and statuses that may be stored in repository 120. The data structure of a table is used as an exemplary data structure, though any data structure may be used to store the correlation information.

As a first example, the first row in the table 500 indicates a correlation between the failure "F1" and the action "Request freeform information from the user." The failure status indicates "recurrent," and the application that experienced the error is "Outlook." Each failure is associated with a particular application since the analysis server may be used for resolution of many different applications at any given time. While the action is in layman's terms, the actions may include specific code instructions for execution at the client device. The example in the first row indicates that the specific failure "F1" is recurrent. For example, the trend information may indicate that the reason for the specific failure "F1" was previously resolved but is recurring. As such, freeform information may be requested from the user to narrow down and/or identify the reason for the recurrence. Freeform information may be requested in the form of displaying a text box for the user to type into with a prompt requesting that the user provide information about what was occurring when the crash occurred. This gives the user the freedom to provide information that may be useful including other executing applications, the steps performed leading up to the crash, specific data being entered in the application, and so forth. Note that the analysis central service 115 may update the action to request different information or display a notification when a sufficient number of users have provided freeform information. Limiting the number of users asked to provide information may limit user frustration and help eliminate an overload of information that must be analyzed to resolve the issue causing the specific failure "F1."

As a second example, the second row in the table 500 indicates a correlation between the failure "F2" and the action "Display notification to user to update antivirus software." The failure status indicates "solved," and the application is "PowerPoint." This example indicates that the reason for the specific failure "F2" is outdated antivirus software, and the solution is notifying the user to update the antivirus software. Updating the antivirus software is one example of a solution that may resolve a specific failure, but any other solution may be included in the notification based on the identified resolution for the specific failure.

As a third example, the third row in the table 500 indicates a correlation between the specific failure "F3" and the action "Request information from the user." The failure status indicates "final analysis in progress," and the application is "Word." The action includes several specific questions for the client device to ask the user in a survey type form, for example. These questions may have been identified as being relevant to the issue causing the specific failure "F3." Accordingly, the answers to the questions may be used to complete the final analysis for resolving the issue causing the specific failure "F3." The exemplary questions included are for example only, as any relevant questions may be requested. However, limiting the questions asked to specific questions based on the specific failure experienced by the user may help limit the frustration of the user. Further, when a sufficient number of answers to the questions are received, the action may be changed to, for example, request different information, provide a notification of a solution, or the like.

As a fourth example, the fourth row in the table 500 indicates a correlation between the specific failure "F4" and the action "Request freeform information from the user." The status of the failure is "new," and the application is "OneNote." This example indicates that a new failure has been identified, and not enough information is currently known about what may be causing the specific failure. Accordingly, freeform information may be requested from the user as described above with respect to the first example of specific failure "F1."

As a fifth example, the fifth row in the table 500 indicates a correlation between the specific failure "F5" and the action "Request consent to obtain co-executing application information." The failure status is "Initial analysis in progress," and the application is "Excel." This example indicates that some information is known about the specific failure "F5," however some information about other applications that were executing simultaneously with the application when it crashed may be helpful. In some cases, this information may be collected automatically, but privacy issues may prevent a company from collecting such data without the user's consent. The consent may be requested so that the information may be obtained. In such cases, the consent may be obtained, and several back-and-forth exchanges may occur between the analysis central service 115 and the user device 105 to ensure that the consent is received and then the information collected. In some embodiments, the user may be part of an organization in which an administrator may be the correct person from whom to obtain the consent. In such cases, the analysis central service 115 may notify the administrator of the need for consent for the specific user device 105. Once the administrator consent is obtained, the analysis central service 115 may send the action to the data collection and transmission component 130 to obtain the requested information for which consent was obtained.

Though the information in table 500 is exemplary only, a person of ordinary skill would understand that variations on such data may be used to intelligently obtain the relevant information from the user device 105 upon notification of an in-app crash that resulted in a specific failure for which specific information may be most relevant.

Figure 6A:
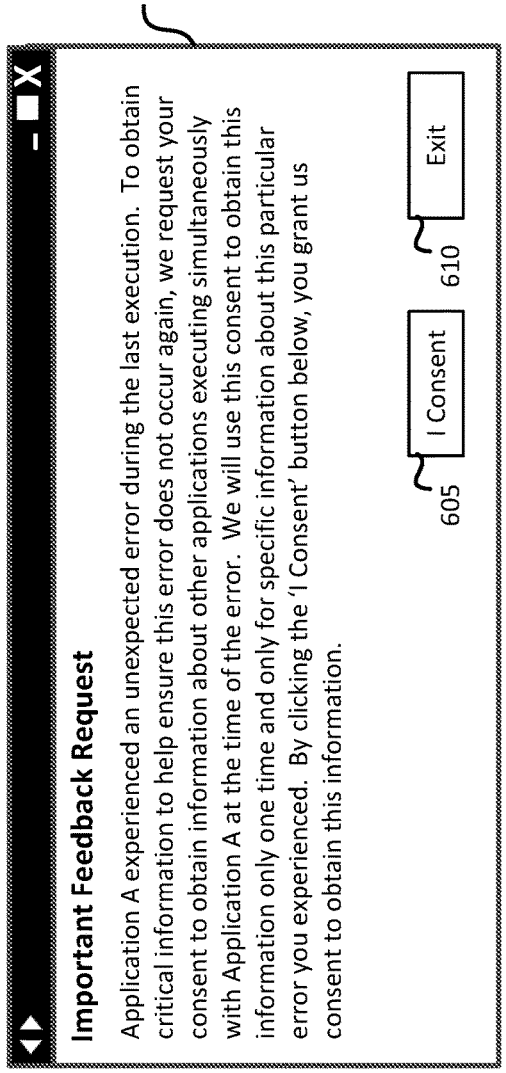
FIGS. 6A and 6B illustrate exemplary graphical user interface, according to some embodiments.
Figure 6B:
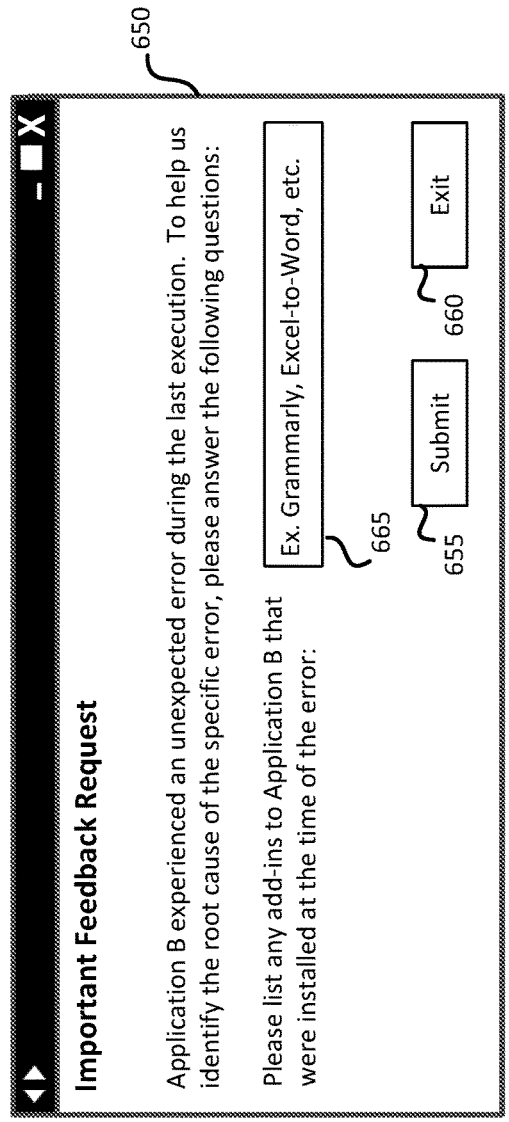

FIGS. 6A and 6B illustrate exemplary graphical user interfaces ("GUIs") 600 and 650. GUI 600 may be generated by user device 105 based on the instructions in the action identified based on the crash indication and specific failure of the application and sent from analysis central service 115 to the user device 105. GUI 600 includes text indicating that Application A (e.g., application 125) experienced an error and requests a single time (i.e., one-off) consent for the user to allow the system to obtain information that the application would not normally have permission to obtain. If the user chooses to consent, the user can select the "I consent" button 605. If the user chooses to decline, the user can select the "Exit" button 610. The requested consent may be to ensure privacy concerns are addressed such that information not otherwise collected is consented to before collection. For example, co-executing applications may be useful for identifying conflicts with, for example, the application and co-executing antivirus software. However, the application may not normally be aware that antivirus software is executing and would not otherwise collect such information without the user's consent. To further address privacy concerns, the consent from the user may be a single-time consent. In some embodiments, the request may include a request for consent over a longer time period or indefinitely. The information obtained is not limited to co-executing applications but may be any information available that may provide insight into the root cause of the specific failure. The language shown in GUI 600 is for exemplary purposes only such that any consent for any information may be requested. Further, the layout and format of GUI 600 is also exemplary.

GUI 650 may be generated by user device 105 based on the instructions in the action identified based on the crash indication and specific failure of the application and sent from analysis central service 115 to the user device 105. GUI 650 includes text indicating that Application B (e.g., application 125) experienced an error and requests specific information from the user for finalizing the analysis of the root cause of the specific error. For example, the error occurs in Application B, and the telemetry data is generated (e.g., the failure hash, stack hash, or other identifier). The user device 105 transmits the crash indicator, including the telemetry data, to the analysis central service 115. The analysis central service 115 uses the telemetry data to identify the specific error and find the correlated action associated with the specific error. In the example of GUI 650, the specific error may indicate that there may be a conflict, for example, with an add-in to the application. Accordingly, the action may include instructions for requesting specific information from the user about add-ins to Application B that were installed at the time of the error. The user device 105 then generates the GUI 650 based on executing the instructions in the action. The request may include a text box 665 for the user to enter the names of any add-ins the user has installed in Application B. A dropdown selection box or other form of entry may be provided to collect the user information. The user may submit any entries by clicking the "Submit" button 655 or exit without providing information by clicking the "Exit" button 660. The requested information may be any information that has been intelligently identified to request to determine the root cause of the specific error. The language shown in GUI 650 is for exemplary purposes only such that any information may be requested. Further, the layout and format of GUI 650 is also exemplary.

FIG. 7 illustrates a computing system 700 suitable for implementing processing operations described herein related to automatic intelligent content generation, with which aspects of the present disclosure may be practiced. As referenced above, computing system 700 may be configured to implement processing operations of any component described herein including the user system components (e.g., application 125, data collection and transmission component 130 of FIG. 1). As such, computing system 700 may be configured as a specific purpose computing device that executes specific processing operations to solve the technical problems described herein including those pertaining to generation of intelligent content for users based on limited text inputs of the user. Computing system 700 may be implemented as a single apparatus, system, or device or may be implemented in a distributed manner as multiple apparatuses, systems, or devices. For example, computing system 700 may comprise one or more computing devices that execute processing for applications and/or services over a distributed network to enable execution of processing operations described herein over one or more applications or services. Computing system 700 may comprise a collection of devices executing processing for front-end applications/services, back-end applications/services, or a combination thereof. Computing system 700 comprises, but is not limited to, a processing system 720, a storage system 705, software 710, communication interface system 715, and user interface system 725. Processing system 720 is operatively coupled with storage system 705, communication interface system 715, and user interface system 725. Non-limiting examples of computer system 700 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 720 loads and executes software 710 from storage system 705. Software 710 includes one or more software components (e.g., 712a, 712b) that are configured to enable functionality described herein. In some examples, computing system 700 may be connected to other computing devices (e.g., display device, audio devices, servers, mobile/remote devices, VR devices, AR devices, etc.) to further enable processing operations to be executed. When executed by processing system 720, software 710 directs processing system 720 to operate as described herein for at least the various processes, operational scenarios, and sequences discussed in the foregoing implementations. Computing system 700 may optionally include additional devices, features, or functionality not discussed for purposes of brevity. Computing system 700 may further be utilized as user device 105 or any of the cloud computing systems in system 100 (FIG. 1), flowchart 200 (FIG. 2), method 300 (FIG. 3) and/or method 400 (FIG. 4).

Referring still to FIG. 7, processing system 720 may comprise processor, a micro-processor and other circuitry that retrieves and executes software 710 from storage system 705. Processing system 720 may be implemented within a single processing device but may also be distributed across multiple processing devices or sub-systems that cooperate in executing program instructions. Examples of processing system 720 include general purpose central processing units, microprocessors, graphical processing units, application specific processors, sound cards, speakers and logic devices, gaming devices, VR devices, AR devices as well as any other type of processing devices, combinations, or variations thereof.

Storage system 705 may comprise any computer readable storage media readable by processing system 720 and capable of storing software 710. Storage system 705 may include volatile and nonvolatile and/or removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations, storage system 705 may also include computer readable communication media over which at least some of software 710 may be communicated internally or externally. Storage system 705 may be implemented as a single storage device but may also be implemented across multiple storage devices or sub-systems co-located or distributed relative to each other. Storage system 705 may comprise additional elements, such as a controller, capable of communicating with processing system 720 or possibly other systems.

Software 710 may be implemented in program instructions and among other functions may, when executed by processing system 720, direct processing system 720 to operate as described with respect to the various operational scenarios, sequences, and processes illustrated herein. For example, software 710 may include program instructions for executing one or more content generation applications 712a as described herein. Software 710 may also include program instructions for executing one or more Raw Signal Collection & Cleaning components 712b for collecting and cleaning the raw signals into cleaned collaboration signals, as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 710 may include additional processes, programs, or components, such as operating system software, virtual machine software, or other application software. Software 710 may also comprise firmware or some other form of machine-readable processing instructions executable by processing system 720.

In general, software 710 may, when loaded into processing system 720 and executed, transform a suitable apparatus, system, or device (of which computing system 700 is representative) overall from a general-purpose computing system into a special-purpose computing system customized to execute specific processing components described herein as well as process data and respond to queries. Indeed, encoding software 710 on storage system 705 may transform the physical structure of storage system 705. The specific transformation of the physical structure may depend on various factors in different implementations of this description. Examples of such factors may include, but are not limited to, the technology used to implement the storage media of storage system 705 and whether the computer-storage media are characterized as primary or secondary storage, as well as other factors.

For example, if the computer readable storage media are implemented as semiconductor-based memory, software 710 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 715 may include communication connections and devices that allow for communication with other computing systems (not shown) over communication networks (not shown). Communication interface system 715 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 725 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 725. In some cases, the input and output devices may be combined in a single device, such as a display capable of displaying images and receiving touch gestures. The aforementioned user input and output devices are well known in the art and need not be discussed at length here.

User interface system 725 may also include associated user interface software executable by processing system 720 in support of the various user input and output devices discussed above. Separately or in conjunction with each other and other hardware and software elements, the user interface software and user interface devices may support a graphical user interface, a natural user interface, or any other type of user interface, for example, that enables front-end processing and including rendering of, for example, user interfaces for collecting information from the user about the in-app crashes. Exemplary applications/services may further be configured to interface with processing components of computing system 700 that enable output of other types of signals (e.g., audio output, handwritten input) in conjunction with operation of exemplary applications/services (e.g., a collaborative communication application/service, electronic meeting application/service, etc.) described herein.

Communication between computing system 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method for intelligent data collection and analysis for in-app failures, the method comprising:
  receiving a crash indication comprising information about an application failure on a client device, wherein the application failure comprises a failure of a first application of a plurality of applications that provide crash indications on the client device;
  identifying a specific failure based on a failure identifier in the crash indication, wherein the specific failure identifies the first application and a particular portion of code of the first application;
  identifying an action of a plurality of actions, the action comprising instructions to be executed by the client device, wherein the action is correlated to the specific failure in a data repository, a status of the specific failure in the data repository is resolved, and the instructions are uniquely designed to provide a resolution of the specific failure;
  determining, based on trend information about the specific failure, that the specific failure is a recurrent failure;
  in response to determining that the specific failure is the recurrent failure, changing the action correlated to the specific failure to an updated action by changing the instructions to be executed by the client device from instructions to provide a resolution of the specific failure to instructions to request information related to the specific failure from a user of the client device; and
  transmitting the updated action to the client device.

2. The computer-implemented method of claim 1, wherein the crash indication comprises a failure hash.

3. The computer-implemented method of claim 1, wherein the crash indication comprises a stack hash.

4. The computer-implemented method of claim 1, further comprising:
  receiving follow up information in response to the updated action; and
  storing the follow up information in the data repository.

5. The computer-implemented method of claim 1, wherein the action further comprises instructions to request consent from a user of the client device to collect specific information from the client device related to the application failure.

6. The computer-implemented method of claim 1, wherein the action comprises instructions to display a notification on the client device.

7. The computer-implemented method of claim 1, further comprising:
  modifying the data repository comprising correlation information between the specific failure and the action, the modifying comprising changing the action correlated with the specific failure to the updated action.

8. The computer-implemented method of claim 1, further comprising:
  generating the trend information about the specific failure based on a plurality of crash indications received from a plurality of client devices.

9. The computer-implemented method of claim 1, further comprising:
  modifying the data repository comprising correlation information between a plurality of application failures and the plurality of actions, the modifying comprising changing a second action correlated with one of the plurality of application failures based on information received from a plurality of crash indications related to the one of the plurality of application failures.

10. The computer-implemented method of claim 1, further comprising:
  determining a threshold number of responses are received in response to the updated action; and
  modifying the updated action to stop requesting information related to the specific failure from the user of the client device.

11. A system comprising:
one or more processors; and
a memory having stored thereon instructions that, upon execution by the one or more processors, cause the one or more processors to:
  receive a crash indication comprising information about an application failure on a client device, wherein the application failure comprises a failure of a first application of a plurality of applications that provide crash indications on the client device;
  identify a specific failure based on a failure identifier in the crash indication, wherein the specific failure identifies the first application and a particular portion of code of the first application;
  identify an action of a plurality of actions, the action comprising instructions to be executed by the client device, wherein the action is correlated to the specific failure in a data repository, a status of the specific failure in the data repository is resolved, and the instructions are uniquely designed to provide a resolution of the specific failure;
  determine, based on trend information about the specific failure, that the specific failure is a recurrent failure;
  in response to determining that the specific failure is the recurrent failure, change the action correlated to the specific failure to an updated action by changing the instructions to be executed by the client device from instructions to provide a resolution of the specific failure to instructions to request information related to the specific failure from a user of the client device; and
  transmit the updated action to the client device.

12. The system of claim 11, wherein the crash indication comprises a failure hash.

13. The system of claim 11, wherein the crash indication comprises a stack hash.

14. The system of claim 11, wherein the instructions comprise further instructions that, upon execution by the one or more processors, cause the one or more processors to:
  receive follow up information in response to the updated action; and
  store the follow up information in the data repository.

15. The system of claim 11, wherein the action further comprises instructions to request consent from a user of the client device to collect specific information from the client device related to the application failure.

16. The system of claim 11, wherein the action comprises instructions to display a notification on the client device.

17. The system of claim 11, wherein the instructions comprise further instructions that, upon execution by the one or more processors, cause the one or more processors to:

modify the data repository comprising correlation information between the specific failure and the action, the modifying comprising changing the action correlated with the specific failure to the updated action.

18. The system of claim 11, wherein the instructions comprise further instructions that, upon execution by the one or more processors, cause the one or more processors to:
generate the trend information about the specific failure based on a plurality of crash indications received from a plurality of client devices.

19. The system of claim 11, wherein the instructions comprise further instructions that, upon execution by the one or more processors, cause the one or more processors to:
modify the data repository comprising correlation information between a plurality of application failures and the plurality of actions, the modifying comprising changing a second action correlated with one of the plurality of application failures based on information received from a plurality of crash indications related to the one of the plurality of application failures.

20. The system of claim 11, wherein the instructions comprise further instructions that, upon execution by the one or more processors, cause the one or more processors to:
determine a threshold number of responses are received in response to the updated action; and
modify the updated action to stop requesting information related to the specific failure from the user of the client device.

* * * * *